Aug. 7, 1962  O. A. KERSHNER  3,048,250
FRICTION DISC FOR BRAKES, CLUTCHES AND THE LIKE
Filed Oct. 26, 1959  2 Sheets-Sheet 1

INVENTOR
OSBORN A. KERSHNER
BY Robb & Robb
ATTORNEYS

Aug. 7, 1962   O. A. KERSHNER   3,048,250
FRICTION DISC FOR BRAKES, CLUTCHES AND THE LIKE
Filed Oct. 26, 1959   2 Sheets-Sheet 2
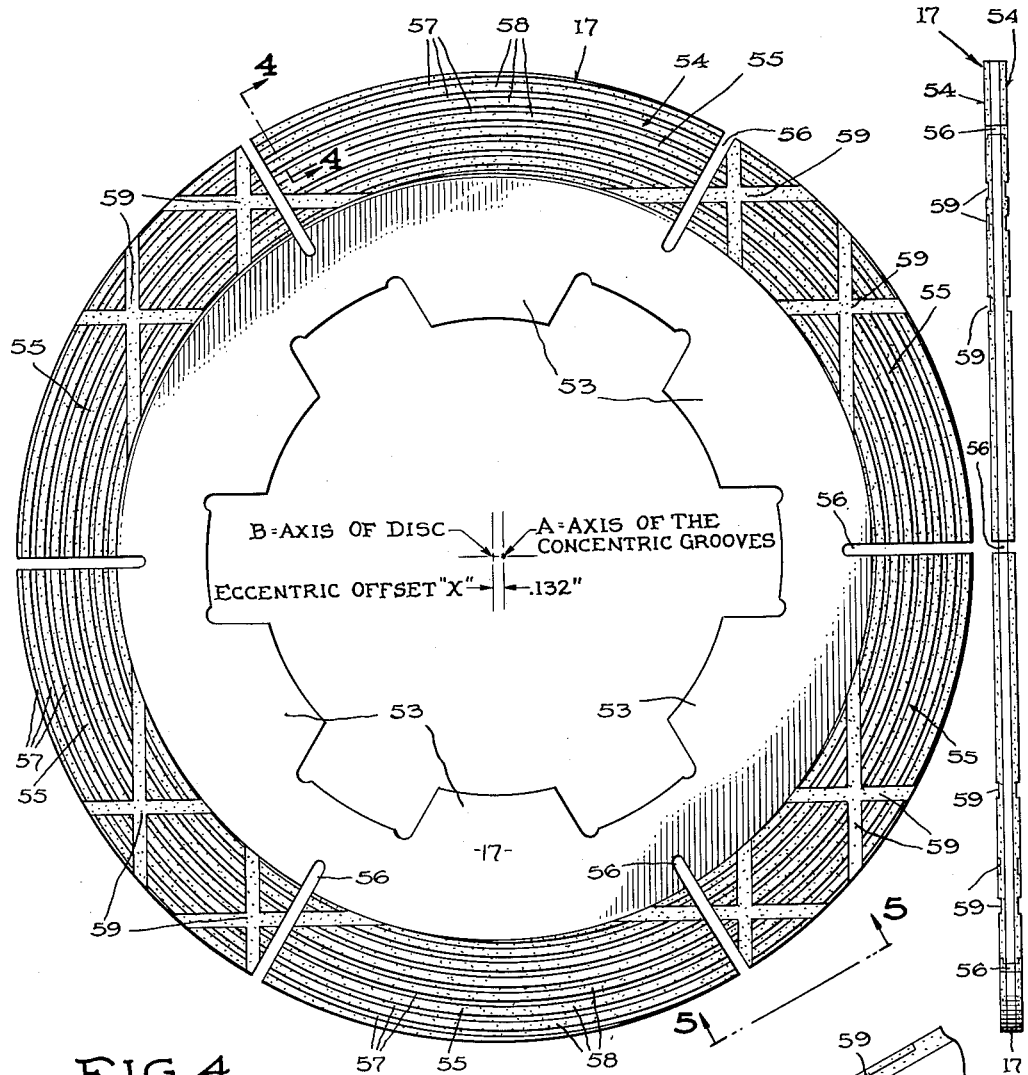
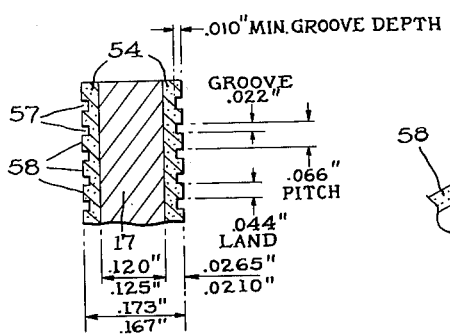
INVENTOR
OSBORN A. KERSHNER
BY
ATTORNEYS United States Patent Office 3,048,250
Patented Aug. 7, 1962

3,048,250
FRICTION DISC FOR BRAKES, CLUTCHES
AND THE LIKE
Osborn A. Kershner, St. Joseph, Mich., assignor, by mesne assignments, to Lambert Brake Corporation, St. Joseph, Mich., a corporation of Michigan
Filed Oct. 26, 1959, Ser. No. 848,712
4 Claims. (Cl. 192—107)

The present invention relates to friction discs for use in disc type brakes, clutches and the like, and, more particularly, to an improved friction disc which is especially applicable to use in heavy duty multiple-disc type of friction devices such as encountered in various kinds of tractor and/or trailer type vehicles, freight and passenger carrying trucks and buses, earth working machinery and equipment, as well as in the operation of heavy industrial machinery. Each of these classifications involves the use of heavy duty equipment requiring optimum effective absorption and transmission of high torque energy, as well as the dissipation of the attendant high heat energy generated during use thereof.

One specific disadvantage of many currently used allegedly heavy duty friction devices which utilize friction discs therein for uses as above-mentioned, is the unsatisfactory form of the friction disc components from the standpoint of achieving long wear and optimum cooling thereof so as to be able to withstand the rigors of repeated and continuous severe friction engaging applications. Consequently, these devices usually fail in their intended purpose to provide an effectively rugged assembly which does not require frequent and undue replacement of the disc components. Otherwise, such devices would be suitable and adaptable to dual performance, such as acting both as a heavy duty retarder capable of replacing the heavy, cumbersome and expensive transmission type of retarders, and acting as the regular service brake. The attendant relatively short life of many conventional brakes makes them unsatisfactory for this desired dual use.

Accordingly, a primary object of this invention is to provide an improved heavy duty friction disc which contributes to overcoming the foregoing disadvantages, and which embodies a novel construction which minimizes wear and considerably increases the effective life, not only of the disc itself, but also of the friction device with which discs of this improved form are used.

Another object of the invention is to provide an improved friction disc having a plurality of circumferentially, radially and chordally disposed cooling grooves and/or slots which are capable of being simply and inexpensively machined or otherwise formed therein to achieve optimum cooling characteristics thereof.

More specifically, it is an object of this invention to provide an improved annular friction disc which is adaptable for service either as a rotor or a stator disc, said friction disc being provided upon opposite faces thereof with a plurality of annular cooling grooves which define a plurality of annular friction lands therebetween. The lands and the grooves are disposed concentrically to each other, but eccentrically to the axis of the disc per se and to the axis of the friction device upon which it is mounted. The improved discs are preferably assembled in interleaved and relatively rotatable association with other friction disc components of the particular device in which they are utilized. Because of the eccentric disposition of the lands and grooves, there is a combined radial and rotary motion thereof that occurs during operation of the device, whereby each land follows an eccentric radial wipe path that overlaps one or more of the paths of other lands adjacent thereto, with the advantage of minimizing scoring and wearing of grooves on the contiguous mating friction disc surfaces of the device in which said discs are used, said latter discs preferably being substantially flat and ungrooved.

Other and further objects and advantages of the invention will be hereinafter set forth or will become apparent to those skilled in the art from the following detailed description, and the novel features thereof will be defined in the appended claims.

In the drawings:

FIG. 2 is an enlarged elevational view of one of the rotor friction discs embodying my improved construction;

FIG. 3 is a side elevational view of the disc of FIG. 2;

FIG. 4 is an enlarged fragmentary cross-sectional view through the rotor disc as taken substantially on line 4—4 of FIG. 2; and FIG. 5 is an enlarged fragmentary edge view of a portion of the rotor disc as viewed in elevation on line 5—5 og FIG. 2.

Figure 1:
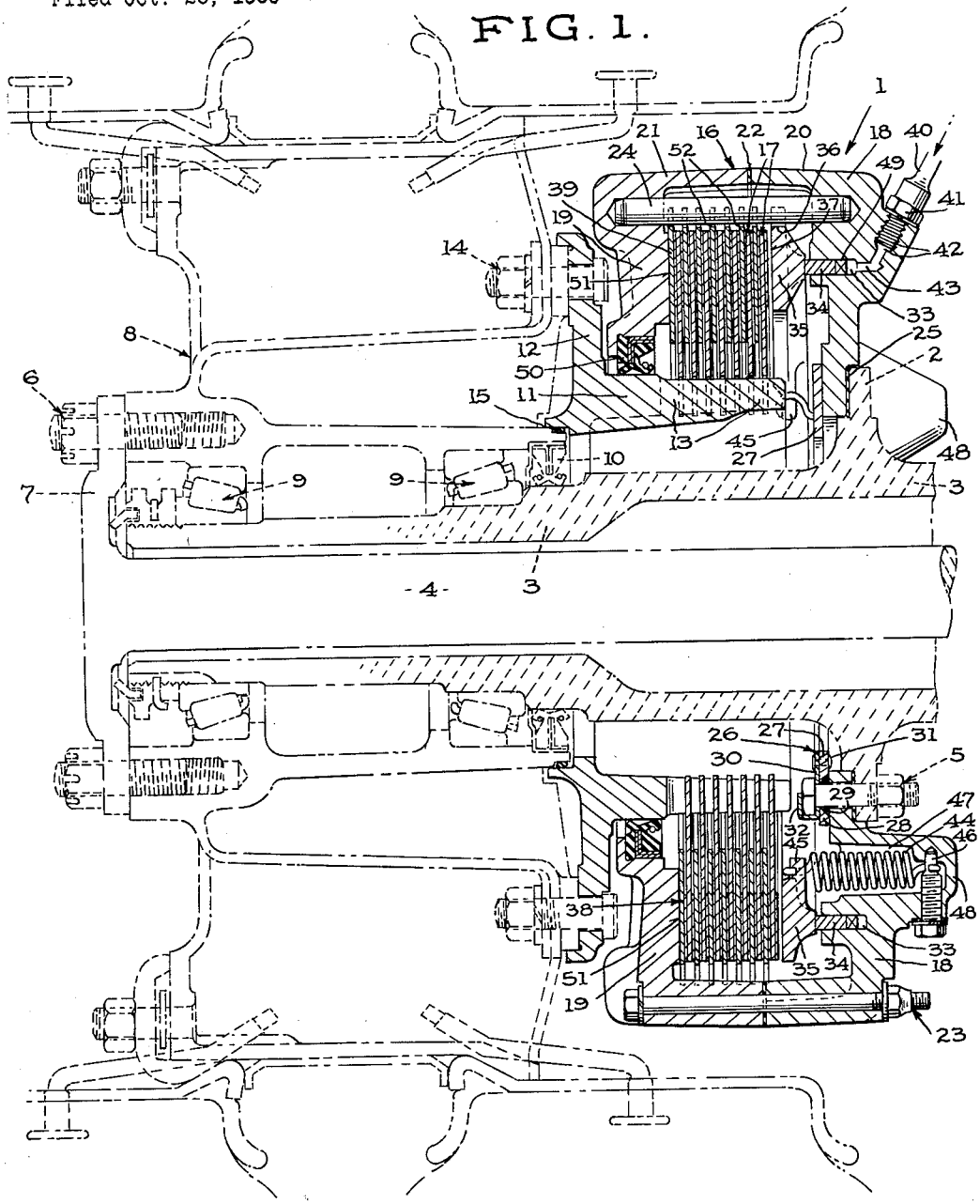
FIG. 1 is a vertical cross-sectional view through a typical heavy duty fluid-cooled brake as shown in a non-applied condition, and which is illustrative of a rear-driven axle dual wheel type brake adaptable to perform the dual function of retarding and/or normal service braking, wherein rotor friction discs embodying my improved construction are utilized.

Like reference characters designate corresponding parts throughout the figures of the drawings, wherein for the purpose of illustrating one practical application of my improved disc, a friction device in the form of a heavy duty retarder-brake embodying said improved discs is shown in FIG. 1, said device having the form of a relatively stationary brake assembly generally designated 1 which is sealingly secured to a supporting or mounting flange 2 of an axle housing 3 for a rotary drive axle 4, as by means of bolt and nut assemblies 5. The axle 4 is shown connected in the usual manner, as by means of stud and nut assemblies 6 passing through the radially extended end flange of head 7 of the axle 4, to operatively drive a wheel hub assembly 8 which is rotatably mounted upon the axle housing 3 by means of appropriate roller bearing assemblies 9, 9 interposed therebetween. Inboard of the innermost bearing 9, there is provided an appropriate oil seal 10 to help seal the interior of the friction device against loss of cooling fluid. The axle housing 3, drive axle 4, wheel assembly 8 and their related parts have been illustrated in broken lines to more readily distinguish them from the brake assembly per se, since the details of the former are not material to the present invention.

Referring to the brake assembly shown in FIG. 1, which is merely illustrative of one practical application of the improved friction discs hereof, a rotor friction disc driver member 11, having a mounting flange 12 extending radially outward from its main cylindrical body or splined hub portion 13, is connected for rotation with the wheel hub assembly 8 by means of a plurality of bolt and nut assemblies 14. The inner periphery of the flange 12 cooperatively shoulders upon the inner hub end of the wheel assembly 8 and is provided with static sealing means 15 therebetween to preclude loss of the coolant fluid from within the brake.

The splined hub portion 13, which projects into the interior of a 2-part cylindrical stationary housing assembly 16, serves to rotatably carry and drive a plurality of my complementary splined improved rotor friction discs 17, the specific details of which will be described hereinafter. The discs 17 are disposed for freely shiftable axial movements upon the splined hub 13.

The 2-part housing assembly 16 generally comprises inboard and outboard housing members 18 and 19, respectively, which are respectively provided with complementary outer flanges 20 and 21 which, when in assembled relationship, clamp an annular fluid sealing gasket 22 therebetween, thus forming a strong and preferably lightweight hollow brake shell which is held in assembly by a plurality of circumferentially spaced bolt and nut assemblies 23. Preferably interposed circumferentially between each of the latter bolt and nut assemblies is a stator friction disc anchor stud or pin 24, which is slip-fittingly mounted within complementary opposed axially extended sockets in both housing members, said anchor studs 24 serving to uniformly distribute and absorb the braking torque throughout the brake housing assembly 16.

The inboard housing member 18 securely mounts the housing assembly 16 as a whole upon said support flange 2, with a sealing gasket 25 interposed therebetween, said mounting being accomplished by means of the aforementioned bolt and nut assemblies 5, each of the latter being sealed against fluid loss by appropriate sealing means seating in a combined mounting-bolt-and-seal-retainer plate assembly 26. The latter assembly 26 comprises an annular plate 27 having circumferentially spaced beveled mounting holes 28 in which the sealing means, preferably in the form of O-ring seals 29, are seated to grip the periphery of each mounting bolt shank and to abut against the inner peripheral mounting flange of the inboard housing member 18 during assembly thereof. In order to more readily facilitate the mounting and to prevent the mounting bolts from turning as the nuts are drawn up tight, each bolt is preferably provided with a U-shape bolt retainer or clip 30 secured to the plate 27 as by rivets 31. Each clip 30 has a shorter leg 32 bent contiguously to one of the flats of and to the end face of the bolt head and abutting against the end of said bolt head to hold it in its proper mounting position.

Slidably disposed within an annular axially extended piston cylinder 33 formed in the inner radial wall of inboard housing member 18 and opening inwardly of the housing, is a complementary annular actuator piston 34 for reciprocable axial movements therein and operable against one side of a generally flat annular primary actuator disc 35.

The primary actuator disc 35 is disposed for axially slidable movements by means of circumferentially spaced peripheral notches 36 which slidably pilot the disc 35 on the stator disc anchor pins 24. The actuator disc 35 is provided with one flat face 37 which operably engages against a friction disc pack 38 which preferably comprises a plurality of interleaved rotor and stator discs, 17 and 39 respectively, responsive to operating pressure fluid directed into the piston cylinder 33 and against the piston 34, by way of a conduit 40, a fitting 41 disposed in a fluid inlet port 42 in the inboard housing member 18, and a passageway 43 which interconnects port 42 and piston cylinder 33.

The actuator disc 35 is normally biased away from and out of engagement with the disc pack 38 by means of a plurality of return springs 44 which each engage at one end over a radially inwardly projecting finger 45 on the inner periphery of actuator disc 35, and at the other end anchor on a gasketed spring retainer pin 46 which extends into the outer-most end of a spring mounting recess 47 formed within axially extended housing projections 48 on the inboard housing member 18.

The actuator piston 34 is provided with any suitable annular sealing means 49 disposed adjacent thereto to prevent leakage of operating pressure fluid there-past.

Reverting back to the outboard housing member 19, the inner periphery thereof is provided with a shouldered seat in which is disposed a conventional rotary fluid sealing member 50, generally similar to wheel hub seal 10, and sealing member 50 seals against the hub of rotor disc driver 11 to complete the sealing of the assembled friction device in order to preclude loss of the coolant fluid which preferably enters and exits the sealed housing assembly 16 through a pair of diametrically opposed ports, not shown. Sealing member 50 also serves as a dust seal to preclude entry of foreign materials into the brake assembly. Further, the outboard housing member 19 is provided with a radially extended flat annular friction surface 51 on the inner face of the end wall portion, said wall and surface acting as a so-called back-up plate or secondary brake disc between which and the primary actuator disc 35 the friction disc pack 38 is interengagingly gripped to effect either momentary snubbing or retarding action of the brake, if desired to be used as a retarder, or a full and complete service braking action on the vehicle upon which the assembly is mounted.

As previously mentioned, the disc pack 38 comprises a plurality of interleaved, axially shiftable relatively rotatable rotor and stator discs, 17 and 39 respectively, of which the stator friction discs 39 comprise annular disc bodies preferably having flat and uninterrupted friction surfaces on opposite sides thereof. The stator discs 39 are further provided on their outer periphery with circumferentially spaced notched ears or lugs 52 which cooperatively and slidingly seat the stator discs 39 upon the correspondingly disposed anchor studs or pins 24, thereby permitting free axially shiftable movements while precluding any rotary movements thereof.

Reference will now be made to FIGS. 2-5 inclusive, which depict enlarged detailed views of one of my improved friction discs, and which for illustrative purposes is shown as a rotor disc 17. It is to be understood, however, that this improved disc construction is equally applicable to friction discs or plates which are utilized as stator discs or as friction surfaces on the end walls of the housings for various friction devices. Each rotor disc 17 comprises a flat annular ring or disc body having a plurality of suitable driving lugs or splines 53 which cooperate with the complementary splined hub 13 of the rotor disc driver 11, and preferably is further provided on opposite faces thereof with an annular band or disc of sintered or other suitable friction lining material 54 bonded or otherwise secured thereto. The lining material 54 is further preferably divided into a plurality of arcuate segments 55 by a plurality of circumferentially spaced radially projecting slots 56 cut completely through the lining and the disc 17. The slots 56 which serve both as stress relief and as fluid coolant flow slots, are radially outwardly open at the outer periphery of the disc 17 and extend radially inwardly toward the axis B o fthe disc, terminating at a point inwardly of the mid-portion of the overall radial width of the disc 17. This is preferred so as to overlap with oppositely extended similarly formed slots (not shown) preferably provided in the stator discs, so that at certain times during their relative rotation, through-way cooling channels are provided to afford an easier flow of the coolant through and around the disc pack. To further facilitate the flow of a coolant fluid in and around the discs of the disc pack, the band of lining material 54 is provided with at least one, and more preferably with a plurality of circular grooves 57 which define circular lands 58 therebetween. The grooves 57 are disposed eccentrically to the axis B of the disc 17, but concentrically to each other about the axis A which is slightly offset from axis B as clearly shown in FIG. 2, the amount of offset being designated as "X." The grooves 57 are interrupted by the radially extended slots 56 and also by several pairs of right angularly intersecting chordally disposed coolant grooves indicated at 59 (sometimes referred to as wagon tracking) which preferably are not cut all the way through the lining material 54, and which, together with slots 56 are desired to provide additional coolant pathways for cooling the friction surfaces and supplementing those which the concentric grooves 57 are capable of affording alone. Both the grooves 57 and 59 preferably have substantially the same depth and more specifically, a minimum depth of .010", as illustratively shown in FIGS. 4 and 5 of the drawings. By disposal of said grooves 57 in an eccentric relation to the axis B of the disc and to the axis of the brake assembly, it becomes readily apparent that as the rotor discs 17 rotate relative to and frictionally against the contiguous stator discs 39 during either retarding or regular service braking applications, an eccentric radial wiping action of the stator discs by the lands 58 takes place, whereby each land eccentrically revolves about the axis B and develops a radial wipe path, the width of which is equal to twice the eccentric offset of the 2 axes A and B, plus the radial width of the land doing the wiping. As a specific example, illustrative relative dimensions of one practical embodiment of a rotor disc having an annular friction lining surface with an 11¾" I.D. and a 14¾" O.D., have been applied to these parts as shown in FIGS. 2, 4 and 5. Thus, using these dimensions it can be readily determined that the radial wipe path for any given land 58 will be equal to twice the .132" eccentric offset of the axes A and B, plus the .044" radial width of the land, which equals a total of .308". Dividing this .308" by the pitch .066" of the lands results in a figure of 4.666, thereby indicating that the contiguous stator disc friction surface area is swept or wiped 4⅔ times outwardly and inwardly per revolution of the disc. Also, it is readily apparent that the sweep path of each land 58 overlaps or extends into the sweep path of the land adjacent to it, and, depending upon the amount of eccentricity of the axis A of the concentric lands and grooves as related to the axis B of the rotor disc 17 per se, the sweep path of each land will usually overlap several of the respective adjacent land paths.

Accordingly, an improved friction disc has been described which is equally adaptable for use as a rotatable or as a stationary disc. Moreover, it is to be understood that the same or similar types of eccentrically and/or chordally disposed grooves, as well as the radially extended slots can be provided in the friction surfaces of a friction disc irrespective of whether or not it is provided with some form of lining material thereon. Also, it is to be understood that the same principle can be achieved when the friction surface of the disc is merely provided with one or two circular coolant grooves which may extend eccentrically about the disc axis from a point on or near the innermost periphery of the friction surface to a point on or near the outeremost periphery thereof, depending upon the amount of eccentric offset desired between the axis of the circular groove or grooves and the axis of the disc per se.

Among the many advantages attained by the use of my improved friction disc construction is a considerably more effective distribution of the coolant fluid over and around the friction surfaces of the friction device in which they are used, while simultaneously affording effective wiping of the surfaces without excessive scoring thereof, which is minimized by the eccentric rotation of the concentric grooves and lands, 57 and 58 respectively, which precludes wearing of grooves on the friction surfaces. Inasmuch as the coolant fluid, when in a hydraulic or liquid form, also inherently acts as a lubricant, it has a tendency to "coat" upon the friction linings and surfaces, and by use of the above-described improved friction disc, the entire friction surface is wiped frequently during each revolution of the rotor disc 17, and a more efficient and effective wiping is provided by the eccentric overlapping movement of the lands during this rotation. Another important advantage resides in the easier, less time-consuming, and less expensive machining operations required for the manufacture of a friction disc having a concentric groove pattern as compared with a spiral groove pattern. Also, it becomes apparent that both the stator and rotor friction discs provide much longer service, particularly under heavy duty or other severe operating service conditions.

From the foregoing, it will be readily apparent that the objects and advantages as related in the preamble and otherwise throughout the body of this specification, are fully attained by my unique friction disc construction disclosed herein.

While the specific details have been herein shown and described, the invention is not intended to be confined or limited thereto as various changes and alterations may be resorted to without departing from the spirit and scope thereof as defined in the appended claims.

I claim:

1. A friction disc of the class described, comprising annular disc body means having an annular friction surface on at least one side thereof, said friction surface being provided with a plurality of generally annular fluid coolant-flow grooves spaced substantially entirely thereacross and disposed eccentrically with respect to the axis of the disc so that certain of said grooves intersect radially inner and outer margins of the annular friction surface, said grooves defining at opposite radial sides thereof concentric lands which are also disposed eccentrically with respect to the axis of the disc, whereby said lands when disposed against an adjacent friction surface are adapted to sweep an eccentric wipe path thereover responsive to relative rotation of the friction surfaces when frictionally interengaged, said disc body means having a plurality of radially extending and circumferentially spaced combined stress relief and fluid coolant-flow slots therethrough, each of said slots intersecting a plurality of said grooves and lands and opening at only one radial margin of the disc body means, and said disc body means including a plurality of sets of circumferentially spaced generally chordally disposed fluid coolant-flow grooves substantially traversing said annular friction surface and intersecting said first mentioned grooves and said lands.

2. A friction disc, as defined in claim 1, wherein said first and second mentioned grooves are substantially of the same depth.

3. A friction disc, as defined in claim 1, wherein each of said sets of grooves comprises a pair of substantially right angularly disposed grooves.

4. A friction disc, as defined in claim 3, wherein each chordally disposed groove of each of said sets of grooves is substantially aligned with a chordally disposed groove of another of said sets.

References Cited in the file of this patent

UNITED STATES PATENTS

| | | |
|---|---|---|
| 1,174,941 | Bache | Mar. 7, 1916 |
| 2,020,748 | Waseige | Nov. 12, 1935 |
| 2,523,501 | Davies et al. | Sept. 26, 1950 |
| 2,690,248 | McDowall | Sept. 28, 1954 |
| 2,733,798 | Almen et al. | Feb. 7, 1956 |
| 2,927,673 | Sand | Mar. 8, 1960 |
| 2,928,504 | Hann et al. | Mar. 15, 1960 |

FOREIGN PATENTS

| | | |
|---|---|---|
| 900,033 | Germany | Dec. 17, 1953 |
| 787,579 | Great Britain | Dec. 11, 1957 |